(12) United States Patent  
Zelepouga et al.

(10) Patent No.: US 7,907,272 B2
(45) Date of Patent: Mar. 15, 2011

(54) FIBER OPTIC SPECTROSCOPIC DIGITAL IMAGING SENSOR AND METHOD FOR FLAME PROPERTIES MONITORING

(75) Inventors: Serguei A. Zelepouga, Hoffman Estates, IL (US); David M. Rue, Chicago, IL (US); Alexei V. Saveliev, Chicago, IL (US)

(73) Assignees: Gas Technology Institute, Des Plaines, IL (US); The Board of Trustees of the University of Illinois, Urbana, IL (US)

( * ) Notice: Subject to any disclaimer, the term of this patent is extended or adjusted under 35 U.S.C. 154(b) by 520 days.

(21) Appl. No.: 12/001,536

(22) Filed: Dec. 12, 2007

(65) Prior Publication Data

US 2009/0153853 A1    Jun. 18, 2009

(51) Int. Cl.
*G01J 3/28* (2006.01)
(52) U.S. Cl. ...................................................... 356/300
(58) Field of Classification Search .................. 356/300; 250/554; 359/507, 509
See application file for complete search history.

(56) References Cited

U.S. PATENT DOCUMENTS

| | | | | |
|---|---|---|---|---|
| 4,328,488 | A | * | 5/1982 | Yanai et al. .................... 340/578 |
| 4,400,097 | A | | 8/1983 | Koschnitzke et al. |
| 4,644,173 | A | * | 2/1987 | Jeffers .......................... 250/554 |
| 4,711,524 | A | * | 12/1987 | Morey et al. .................. 385/117 |
| 5,086,220 | A | | 2/1992 | Berthold et al. |
| 5,317,165 | A | * | 5/1994 | Montagna ..................... 250/554 |
| 5,372,618 | A | | 12/1994 | Andrus, Jr. |
| 5,828,797 | A | | 10/1998 | Minott et al. |
| 6,042,365 | A | | 3/2000 | Chen |

* cited by examiner

*Primary Examiner* — Kara E Geisel
(74) *Attorney, Agent, or Firm* — Mark E. Fejer

(57) ABSTRACT

A system for real-time monitoring of flame properties in combustors and gasifiers which includes an imaging fiber optic bundle having a light receiving end and a light output end and a spectroscopic imaging system operably connected with the light output end of the imaging fiber optic bundle. Focusing of the light received by the light receiving end of the imaging fiber optic bundle by a wall disposed between the light receiving end of the fiber optic bundle and a light source, which wall forms a pinhole opening aligned with the light receiving end.

11 Claims, 10 Drawing Sheets

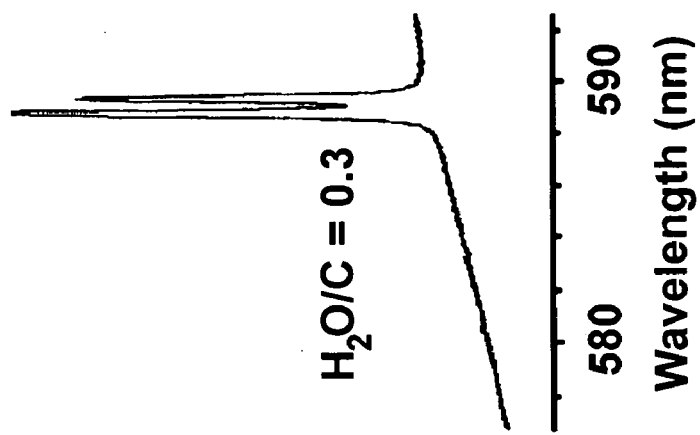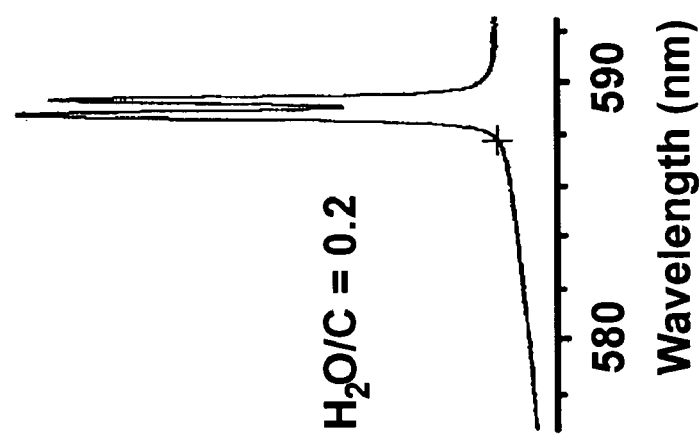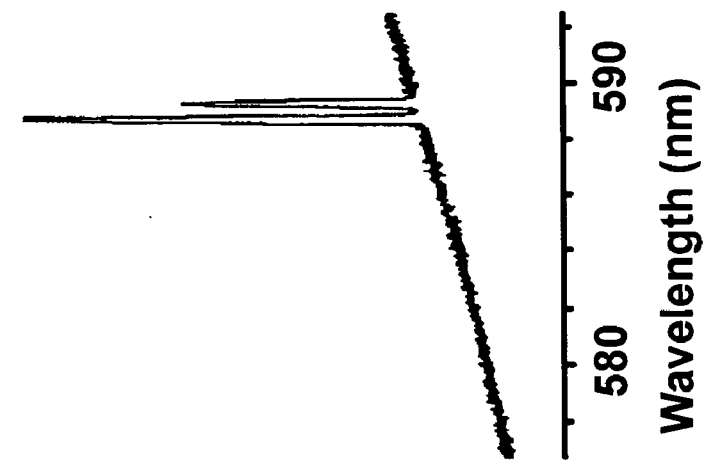

FIBER OPTIC SPECTROSCOPIC DIGITAL IMAGING SENSOR AND METHOD FOR FLAME PROPERTIES MONITORING

The U.S. Government has a paid-up license in this invention and the right in limited circumstances to require the patent owner to license others on reasonable terms as provided for by the terms of Contract No. DE-FC26-02NT41585 awarded by the U.S. Department of Energy.

BACKGROUND OF THE INVENTION

1. Field of the Invention

This invention relates to a method and apparatus for monitoring the properties of flames in high pressure combustors and gasifiers in real time. More particularly, this invention relates to a sensor for real-time monitoring of flame properties using fiber optic spectroscopic digital imaging. Although intended for use in connection with pressurized combustors and gasifiers, the method and apparatus of this invention may be employed in any combustion apparatus in which slagging occurs or in which the environment of the combustion process is particle- and/or particulate-laden, i.e. a "dirty" or "dusty" environment, including processes at about atmospheric pressure.

2. Description of Related Art

Real-time monitoring of flame properties in high pressure combustors and gasifiers is increasingly important for providing stability, control, and optimization of combustion processes. Present control methods are mostly limited to the measurement of global system parameters such as output product compositions and emission levels or to the measurement of parameters which provide only limited information regarding the overall processes. Measurements performed inside the flame zone using thermocouples or optical pyrometers generally provide only point or line-of-sight information that is insufficient for characterizing the overall combustor performance. See, for example, U.S. Pat. No. 4,400,097 to Koschnitzke et al. which teaches a system for measuring temperatures in a high pressure reactor using an optical pyrometer which is in optical communication with a measuring duct which may be disposed in the reactor wall and is in optical communication with the reactor interior.

The use of fiber optics in a flame analyzer for analyzing one or more properties of a flame is known. U.S. Pat. No. 4,644,173 to Jeffers teaches a flame analyzer comprising a fiber optic array having a plurality of optic fibers, each of which has a light receiving end lying in a line and facing a flame. Each fiber of the array collects light from a specific location in the flame along a line extending parallel to the flame and burner axis or extending perpendicular to the flame axis. The light received by the fiber optic array is provided as a sheet of light to a monochromator which spreads the light into its component wavelengths. A pair of spaced apart arrays of light detectors is then utilized to measure the light at two discrete wavelengths. The detection produces signals that can be analyzed to generate temperature and particles distribution values for the flame across its length or width.

U.S. Pat. No. 5,828,797 to Minnott et al. teaches a fiber optic linked flame sensor for continuous optical monitoring of the combustion process within the combustion chamber of a gas turbine engine, which sensor includes a high temperature optical probe, a fiber optic cable, and an electro-optics module. The high temperature probe is mounted on the engine skin and sighted in a manner so as to view the combustion process taking place at its origin just aft of the fuel nozzle. It will be appreciated that the view of this probe is limited to a very small portion of the combustion process.

High pressure combustion and gasification processes would benefit enormously from novel non-intrusive imaging monitoring sensors that provide spatially-resolved information on flame properties. However, such processes present several challenges to measurements inside the combustor or gasification reactor vessels. For example, to effect temperature measurements within gasification reactor vessels using conventional means requires the insertion of a temperature probe into the gasifier. However, slag on the walls of the gasifier must be traversed by the probe if measurements are to be made within the interior of the gasifier. In addition, reliability of the measurements is difficult to obtain due to the harsh environment inside the gasifier in the form of dust particles, etc., which tend to obscure the temperature measuring device such that measurements therein may not be obtainable at all or, if obtainable, may be distorted. U.S. Pat. No. 5,372,618 to Andrus, Jr. teaches a temperature measuring device which includes a slag shield mounted on the gasifier so that a portion of the slag shield extends into the gasifier through an opening with which the gasifier is provided for this purpose, and a temperature measuring instrument in the form of a radiation thermometer or optical pyrometer mounted in supported relation within the slag shield so that line-of-sight exists from the temperature measuring instrument into the interior of the gasifier at a point of interest for temperature measurement. The temperature measuring instrument is provided with cooling means for cooling at least the portion of the slag shield extending into the interior of the gasifier and is provided with purge gas means for supplying a flow of purge gas in the area around the temperature measuring instrument to purge particulate matter therefrom and, thus, ensure that the line-of-sight between the temperature measuring instrument and the interior of the gasifier remains unobscured.

SUMMARY OF THE INVENTION

It is one object of this invention to provide a system for flame properties monitoring in a combustor or gasifier which is capable of characterizing the overall combustor or gasifier performance.

It is another object of this invention to provide a system for flame properties monitoring in a combustor or gasifier which is non-intrusive with respect to the interior of the combustor or gasifier.

It is still a further object of this invention to provide a non-intrusive imaging monitoring sensor that provides spatially-resolved information on flame properties.

These and other objects of this invention are addressed by a sensor comprising an imaging fiber optic bundle coupled with a spectroscopic imaging system employing an imaging monochromator and intensified CCD camera. In accordance with one embodiment of this invention, the input plane of the imaging fiber optic bundle is positioned in the refractory of a combustor or gasifier reactor vessel wall in close proximity of the inner reactor cavity of the combustor or gasifier reactor vessel, thereby providing a wide observation angle. The light emitted from various locations within the combustor or reactor vessel is collected by the fiber optic bundle and transmitted as an image to the spectroscopic imaging system where the emitted light can be analyzed to provide spectrally-resolved light intensities in the ultra-violet and visible region. Unique to the system of this invention is the use of a pinhole-sized observation port through which the light from within the combustor or gasifier passes to be collected by the fiber optic bundle. Use of the pinhole-sized observation port or opening provides a means for focusing the flame light onto the fiber optic bundle entrance, thereby obviating the placement of a lens or any other optics between the fiber optic bundle and the flame light. In addition, when using a purging gas, the pinhole-sized opening produces a high velocity low mass flow of purging gas so as to minimize the impact of the purging gas on the combustion or gasification process as well as limit any effects that the purging gas may have on the measurement process. The system further comprises a secondary purging arrangement providing tangential purging with a preheated gas so as to minimize cooling effects and, as a result, frozen slag deposition on the sensor components and refractory.

BRIEF DESCRIPTION OF THE DRAWINGS

These and other objects and features of this invention will be better understood from the following detailed description taken in conjunction with the drawings, wherein:

FIGS. 9(a), 9(b), and 9(c) are diagrams showing the structure of sodium lines in a natural gas preheating flame (a) and coal flames with $O_2/C=0.85$ (b), and $H_2O/C=0.3$ (c)

DETAILED DESCRIPTION OF THE PRESENTLY PREFERRED EMBODIMENTS

Figure 1:
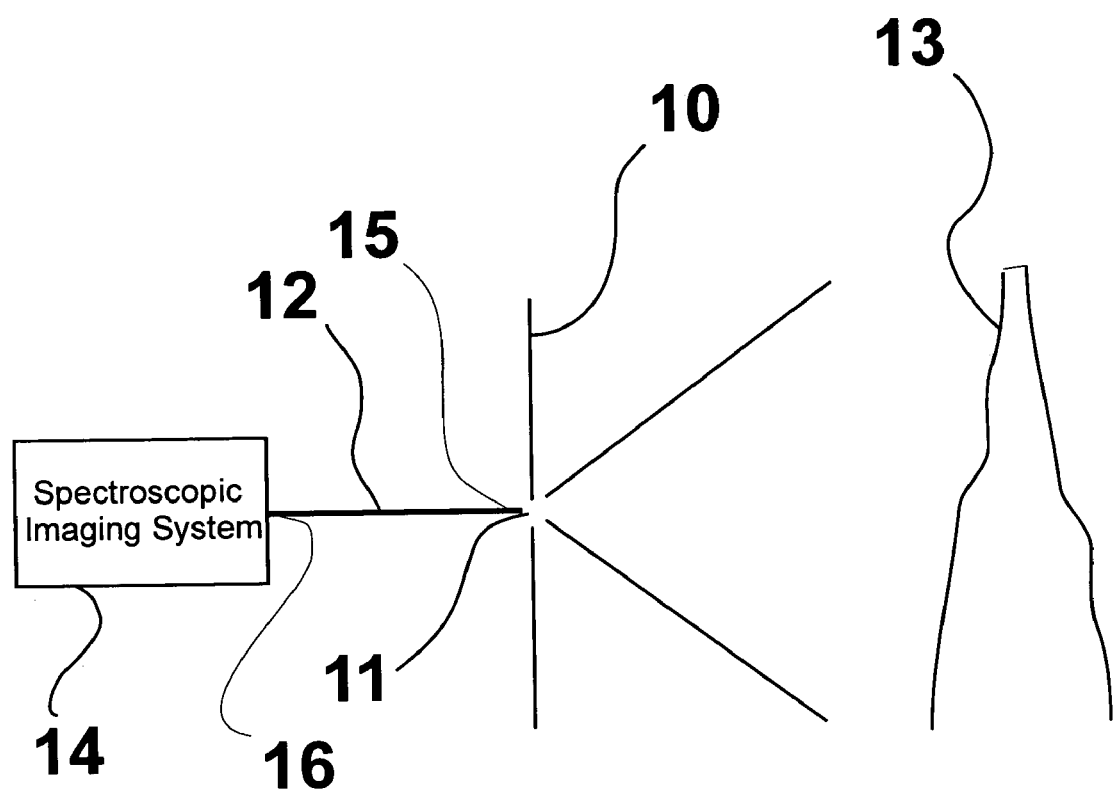
FIG. 1 is a schematic diagram of a sensor in accordance with one embodiment of this invention.

FIG. 1 is a schematic representation of the salient features of the system of this invention. As shown therein, the system comprises a wall 10 having a pinhole opening 11. Imaging fiber optic bundle 12 having a light receiving end 15 and a light output end 16 is disposed on one side of wall 10 with the flame 13 to be monitored disposed on the opposite side of wall 10. Light receiving end 15 of the imaging fiber optic bundle is aligned with pinhole opening 11. Pinhole opening 11 acts to focus the flame image received by the light receiving end of the fiber optic bundle. As used herein, the term "pinhole" refers to openings having a diameter in the range of about 1 µm to about 1 mm. In accordance with one particularly preferred embodiment of this invention, pinhole opening 11 has a diameter in the range of about 10 µm to about 100 µm. Unexpectedly, the use of a pinhole opening obviates the need for focusing lenses, protective windows, or any other object intervening between the light receiving end of the imaging fiber optic bundle and the flame being monitored which could impact the measurement process.

Figure 2:
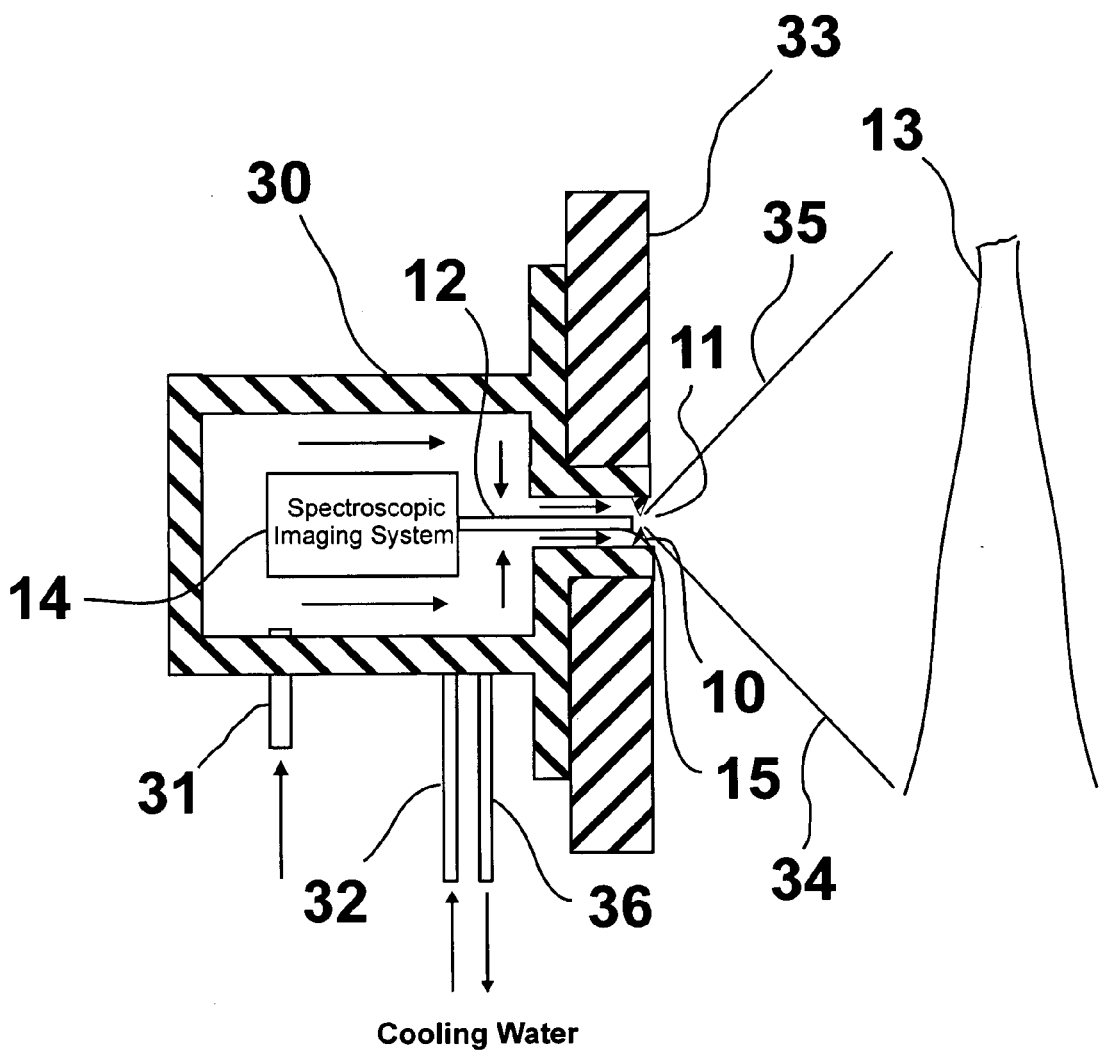
FIG. 2 is a schematic diagram of a sensor in accordance with one embodiment of this invention showing purging gas flow.

FIG. 2 shows a sensor in accordance with one embodiment of this invention for monitoring a gasifier flame 13 sustained in a high pressure vessel with high temperature refractory walls 33. The light receiving end 15 of imaging fiber optic bundle 12 is positioned within refractory wall 33 and is aligned with pinhole opening 11 formed by wall 10. Pinhole opening 11 enables a wide field of view as indicated by view lines 34 and 35 encompassing an extended flame area. In accordance with one embodiment of this invention, wall 10 is an orifice plate having a pinhole opening.

As shown in FIG. 2, in accordance with one embodiment of this invention, imaging fiber optic bundle 12 is disposed within a pressurized enclosure 30. Operably connected with light output end 16 of imaging fiber optic bundle 12 is a spectroscopic imaging system 14 for analyzing the image transmitted by the bundle. In accordance with one embodiment of this invention, spectroscopic imaging system 14 comprises an imaging monochromator and high-sensitivity digital camera that can be positioned inside or outside of the pressurized enclosure. The pressurized enclosure and fiber optic bundle in accordance with one embodiment of this invention are cooled by a circulating water system, such as a water jacket having a circulating water inlet 32 and a circulating water outlet 36. The interior of enclosure 30 is continuously purged by means of a purging gas introduced into the enclosure through purge gas inlet 31. The purge gas, which may be any suitable gas, but is preferably air, is used to prevent contamination of the light receiving end 15 of imaging fiber optic bundle 12 with solid and liquid particles entrained in the swirling gases inside the combustor or gasifier. As shown in FIG. 2, the flow of purge gas is preferably parallel to the direction of the fiber optic bundle. In accordance with one preferred embodiment, the purge gas is preheated, thereby enabling heating of the fiber optic bundle and reducing the impact that cooling of the fiber optic bundle may have on the overall light collection and transmission process.

Figure 3:
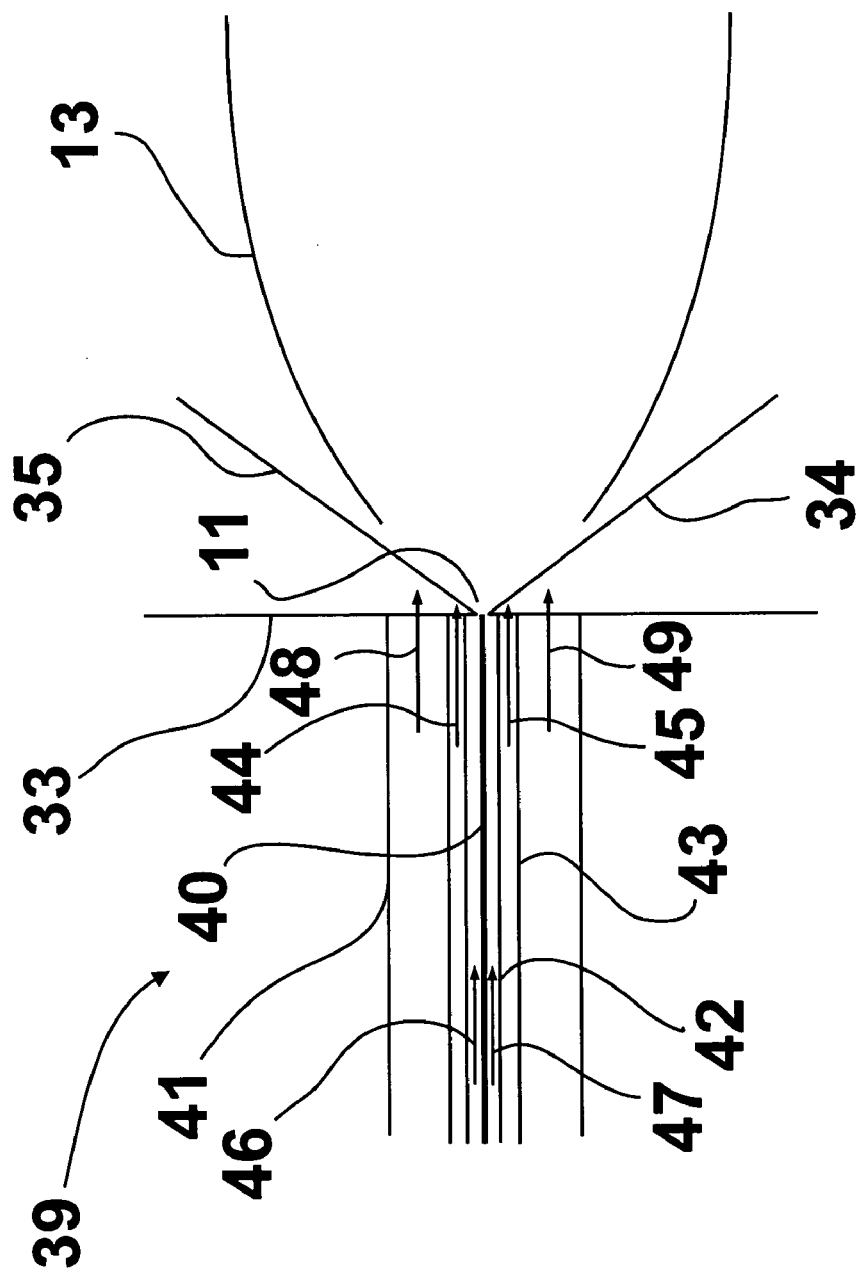
FIG. 3 is a schematic diagram of a sensor in accordance with one embodiment of this invention disposed within a burner nozzle.

FIG. 3 shows a schematic diagram of one embodiment of this invention in which an imaging optical fiber 40 is disposed within the innermost flow conduit 42 of a coaxially fired burner 39. As shown in FIG. 3, the burner 39 comprises an outer tube or nozzle 41, a coaxially disposed inner tube 43 disposed within the outer tube, forming a first annular region between the outer tube and the inner tube, and a coaxially disposed optical fiber conduit 42 disposed within inner tube 43, forming a second annular region between the inner tube and the optical fiber conduit. The first and second annular regions enable flow of the reactants, fuel and oxidant, as indicated by arrows 44, 45, 48, and 49, into a combustion chamber defined by wall 33 resulting in the formation of flame 13. To provide for cooling and/or purging of the region within innermost flow conduit 42, a purge gas, such as oxygen, flows through the conduit as indicated by arrows 46, 47. By virtue of this arrangement, the light receiving end of the imaging optical fiber 40 is in close proximity to the flame, thereby reducing problems associated with the presence of particles in the combustor or gasifier. In addition, this arrangement enables observation of the symmetry of the flame.

Figure 4:
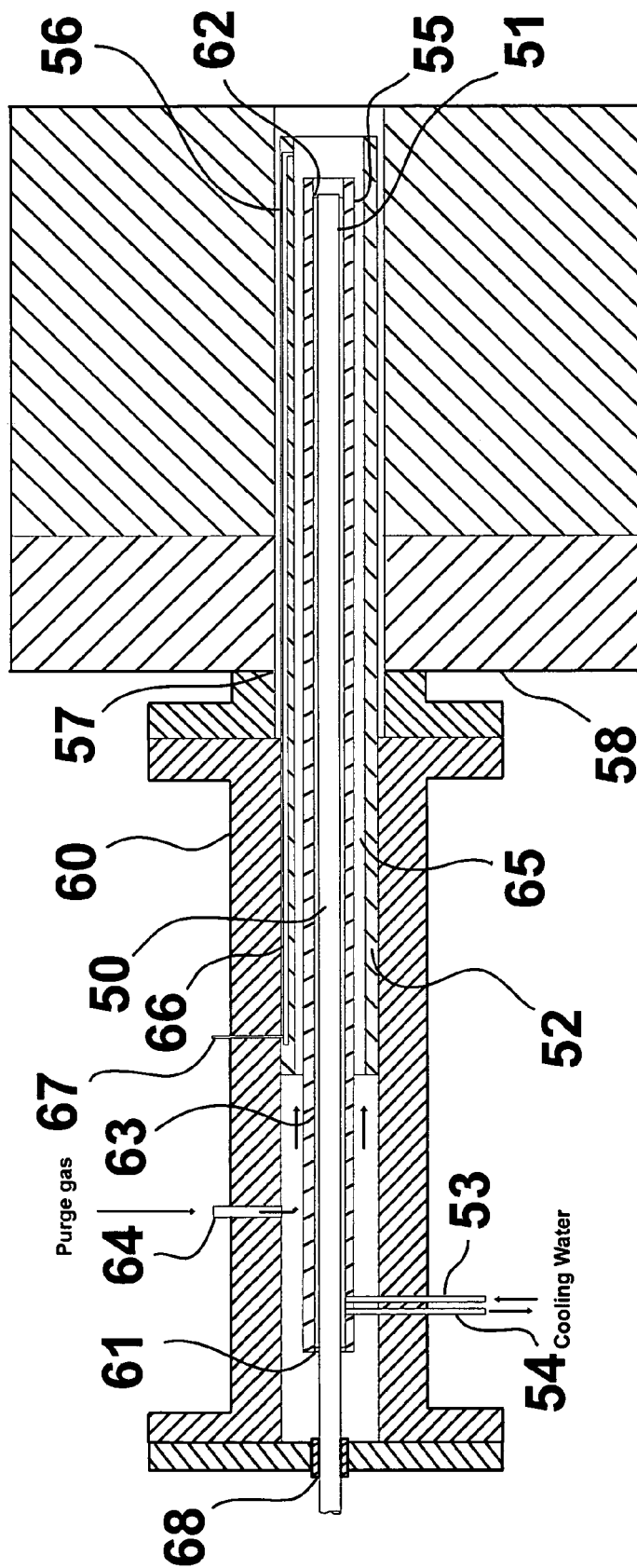
FIG. 4 is a lateral cross-sectional view of a sensor probe and housing extending into the refractory wall of a gasifier.

The sensor in accordance with one embodiment of this invention as shown in FIG. 4 comprises an imaging fiber optic bundle 50 having a light receiving end 51 disposed within a water-cooled jacket 52 having water inlet 53 and water outlet 54 (collectively a water-cooled probe). The water-cooled jacket forms seals 61 and 62, thereby enclosing an annular channel 63 for the flow of water. Also as shown, the light receiving end 55 of the water-cooled probe is disposed within a protective sheath 56 shown extending into an opening 57 formed by outer wall 58 and refractory wall 59 of a gasification reactor vessel. Protective sheath 56 is sized to provide an annular space 65 between the inner surface of the sheath and the outer surface of the water-cooled jacket. The portion of the probe external to the outer wall 58 is disposed within a housing 60 having a purge gas inlet 64 in fluid communication with annular space 65 through which purge gas flows toward the light receiving end 51 of the imaging fiber optic bundle 50 during operation of the sensor. Protective sheath 56 forms a tangential purging gas channel 66 having a tangential purging gas inlet 67 through which additional purging gas flows toward the light receiving end of the imaging fiber optic bundle to provide swirl to the purging gas at the light receiving end of the bundle. Housing 60 is provided with a high pressure feed through 68 through which the portion of the fiber optic bundle distal from the light receiving end is passed out of the housing for connection to the spectroscopic imaging system, which is external to the housing.

Figure 5:
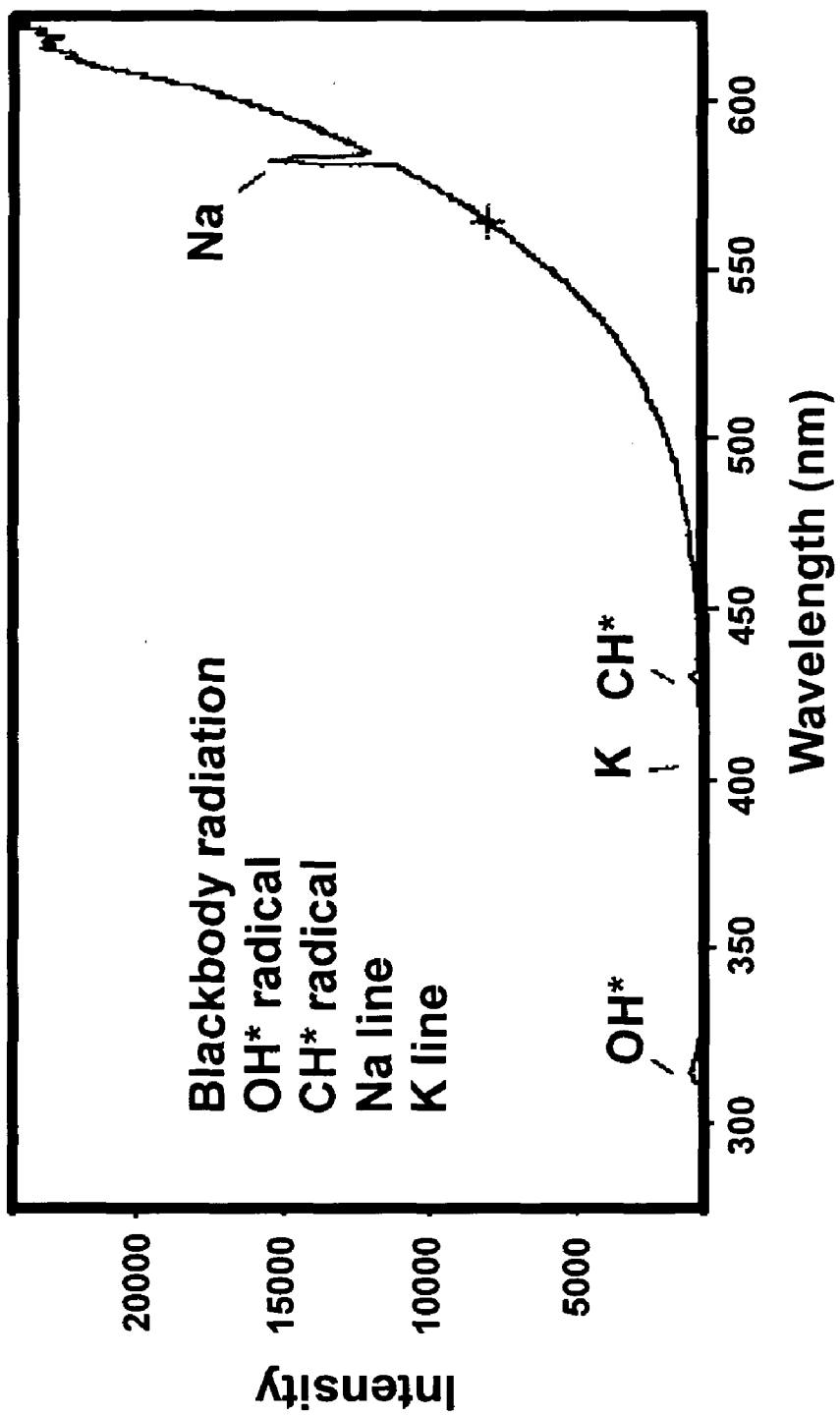
FIG. 5 is a diagram showing the key diagnostic features of a gasifier flame for a natural gas flame used for preheating.
Figure 6:
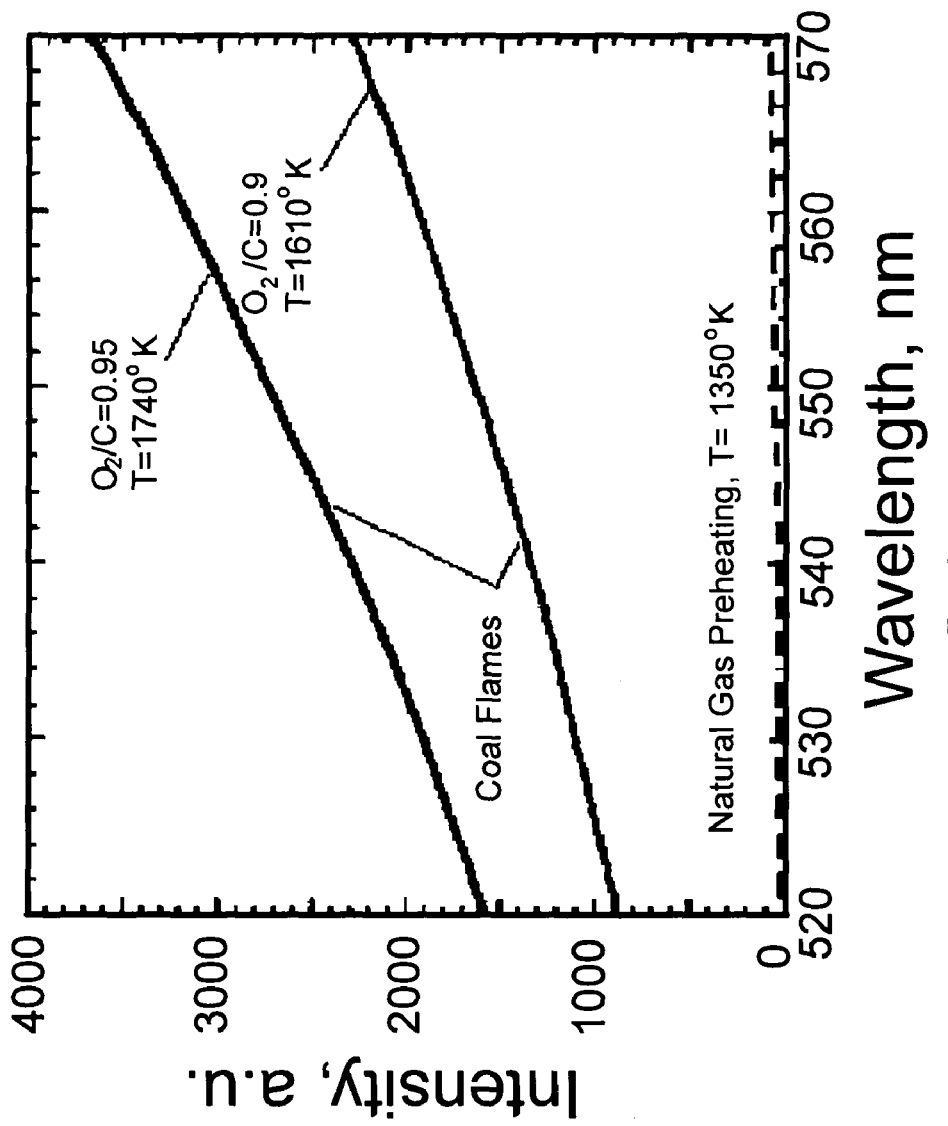
FIG. 6 is a diagram showing the relative intensities of blackbody radiation in the range of about 520 nm to about 570 nm for a natural gas flame and two coal flames.

Analysis of spectral data for evaluation of the variations of spectra with modifications of process parameters (pressure, coal velocity, steam flow, coal-to-oxygen ratio) may be performed using key spectral features of the flame. The key diagnostic features of a gasifier flame are shown in FIG. 5 for the case of a natural gas flame used for preheating. The emission band of OH* radical is positioned at ~310 nm. The CH* radical band is close to 430 nm. Two linear spectra of potassium and sodium (Na) are observed at 410 nm and 590 nm, respectively. The blackbody radiation provides a strong background with intensity rapidly increasing with increases in wavelength. In the case of a natural gas flame, the blackbody radiation is provided by the heated refractory of the gasifier walls. In coal gasification, the main source of blackbody radiation is heated coal particulates and the relative intensity of blackbody radiation may be employed for determining the temperature of the coal flame. A coal flame is also a strong blackbody radiator as can be observed from the relative intensities of blackbody radiation in the range of wavelengths from 520 to 570 nm for a natural gas flame and two coal flames with $O_2/C$ ratios of 0.9 and 0.95 as shown in FIG. 6. As shown in FIG. 6, the coal flame demonstrates much steeper slopes of blackbody curves, which correspond to the higher flame temperatures.

Evaluation of the temperatures of a coal flame may be effected in accordance with the following procedure. The blackbody radiation emitted by the refractory may be used as a calibration source with a known blackbody temperature $-1350°$ K. The spectral sensitivity of the system of this invention may be found as:

$$R(\lambda) = \text{Refractory Signal}(\lambda)/E(\lambda, T\text{ref})$$

where $E(\lambda,T)$ is the spectral intensity of the blackbody for corresponding refractory wall temperatures.

The spectral intensity of blackbody radiation $F(\lambda)$ from the flame may be theoretically found as:

$$F(\lambda) = R(\lambda) * E(\lambda, TF)$$

where $E(\lambda,T)$ is the spectral intensity of the blackbody defined by Planck's law. The best fit for the $F(\lambda)$ distribution is used to determine temperature of the coal flame. The emissivity of the coal flame is assumed to be 1. The obtained flame temperatures are equal to $1610°$ K and $1740°$ K for the tested $O_2/C$ ratios of 0.9 and 0.95, respectively. The accuracy of the measurements was determined to be about $50°$ K.

Figure 7:
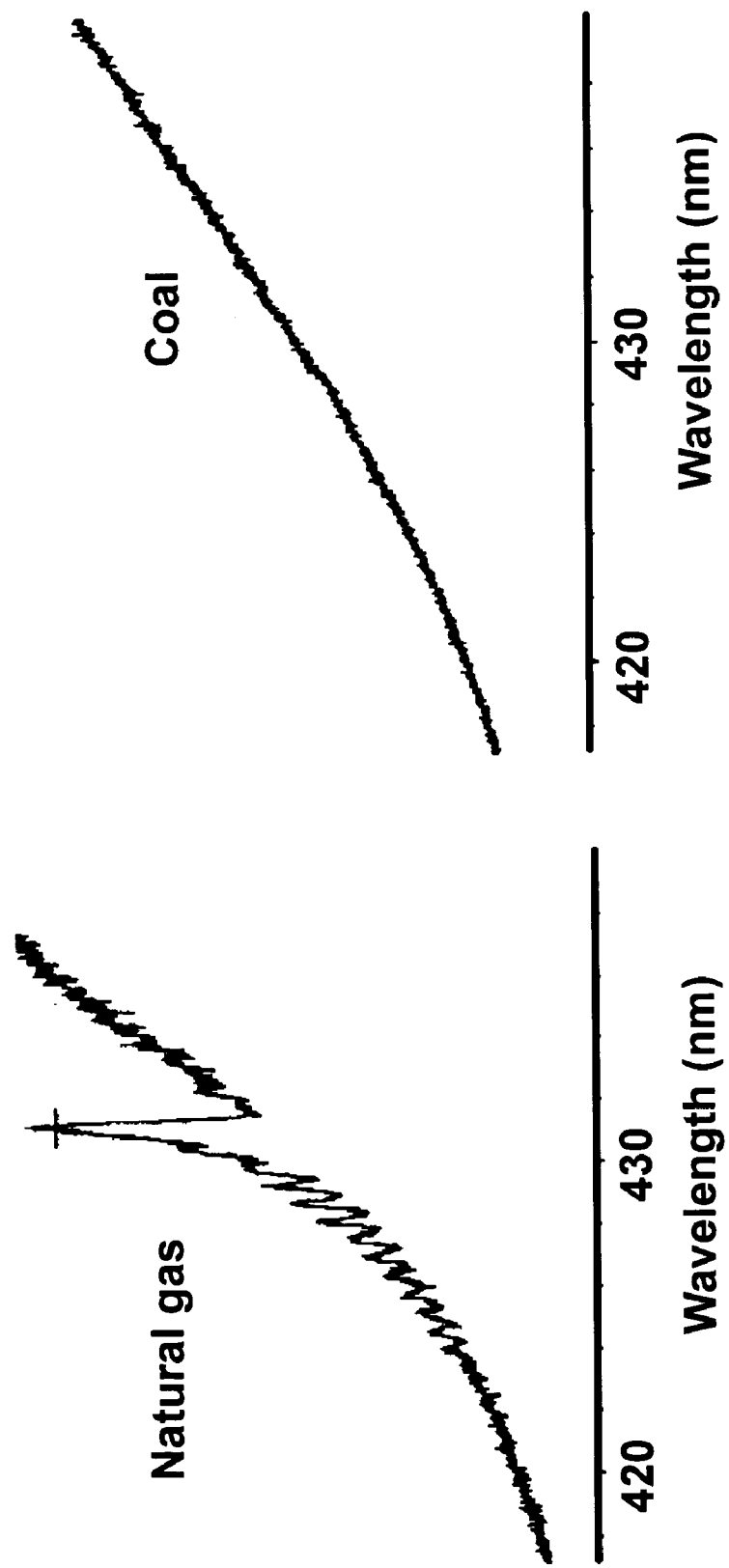
FIGS. 7(a) and 7(b) are diagrams showing the spectra for CH* radicals in natural gas (a) and coal (b) flames.

The spectral features of CH* radicals are strong in natural gas flames due to the presence of hydrocarbon bonds. In coal flames, CH* spectral emissions are almost indistinguishable due to the relatively low hydrogen content and strong background blackbody radiation as shown in FIGS. 7a) and 7b).

However, due to intensities comparable with the noise level, these features were not employed in the analysis of the results.

Figure 8:
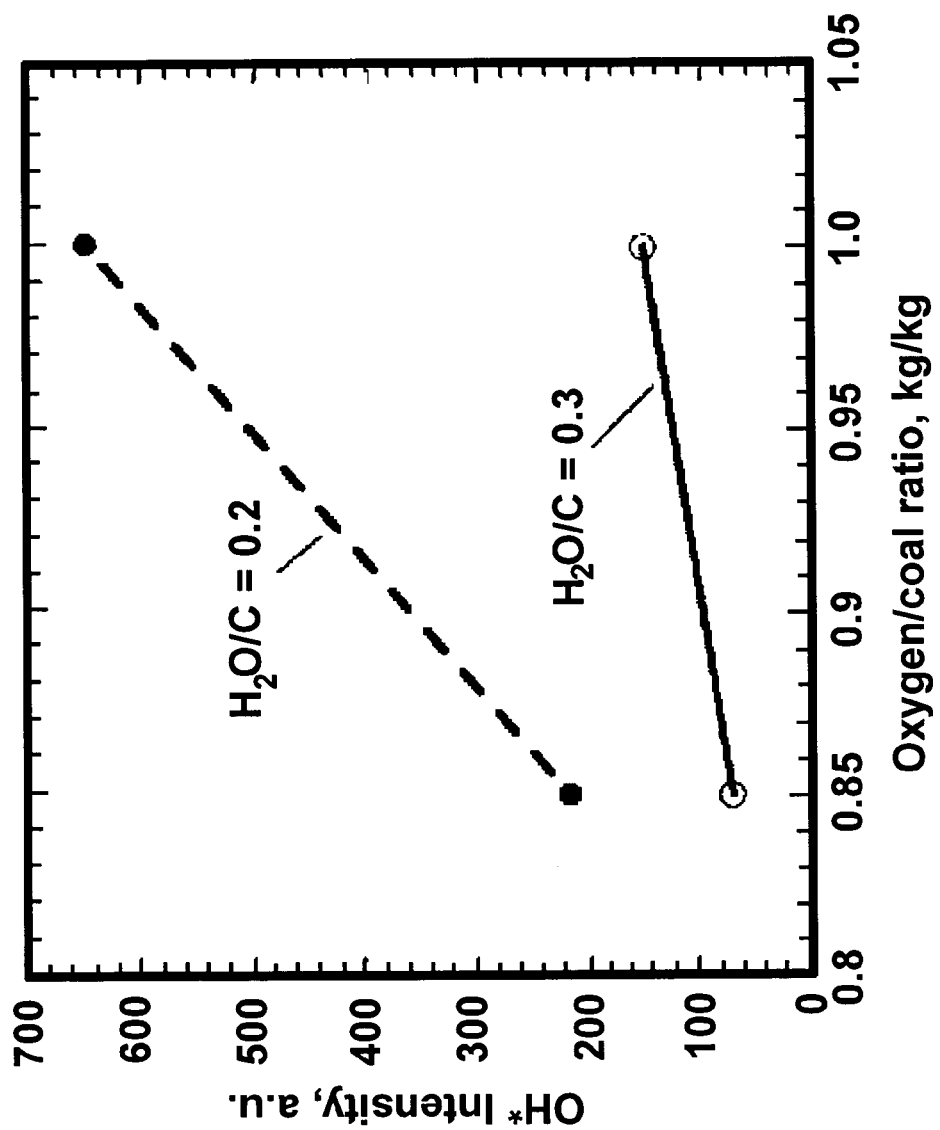
FIG. 8 is a diagram showing the variation in OH* radical intensity as a function of oxygen/coal and steam/coal ratios.

Analysis of the spectral data for various firing conditions reveals that OH* intensities represent a strong indicator of oxygen/coal and steam/coal ratios. These results are presented in FIG. 6 for $H_2O/C$ ratios of 0.2 and 0.3. As clearly shown therein, OH* intensity is higher for $H_2O/C$ ratios of 0.2 than 0.3, thereby suggesting that OH* intensity is reduced with increases in steam content. Similarly, the OH* signal increases with increases of oxygen content for constant steam loads. As shown in FIG. 8, the OH* signal increased from about 60 a.u. to about 140 a.u. with an increase of $O_2/C$ ratio from 0.85 to 1 for a $H_2O/C$ ratio of 0.3. At the same time, for a $H_2O/C$ ratio of 0.2, the OH* signal increased from 200 a.u. to 660 a.u. in the same interval of $O_2/C$ ratios. This suggests that the OH* intensity may be a good indicator of variations in oxygen and steam contents. These data also agree well with existing kinetic models of OH* excitation in flames. The amount of OH* typically increases with oxygen enrichment while steam addition leads to increases in the non-radiative quenching rate of excited OH* in collision with water molecules.

FIGS. 9(a), 9b) and 9c) show that sodium lines positioned at ~590 nm may represent an excellent feature for the diagnostic analysis of coal flames due to high relative intensity and clear separation from the background. It can be clearly observed that the structure of the sodium duplet changes significantly with the transition from natural gas flame to coal flames and with variations in coal flame parameters. In natural gas flames, (FIG. 9(a)) the lines are completely separated and the line at lower wavelengths has an essentially higher intensity. In contrast thereto, the lines are partially overlapping in coal flames (FIGS. 9(b) and 9(c)). The separation pattern varies as well as the intensity ratio between the lines and the intensity ratio of line to the background. All of these features potentially may be used for diagnosis of flame parameters. For example, the ratio of Na line intensity to the intensity of the background strongly depends on steam-to-coal ratio.

Figure 10:
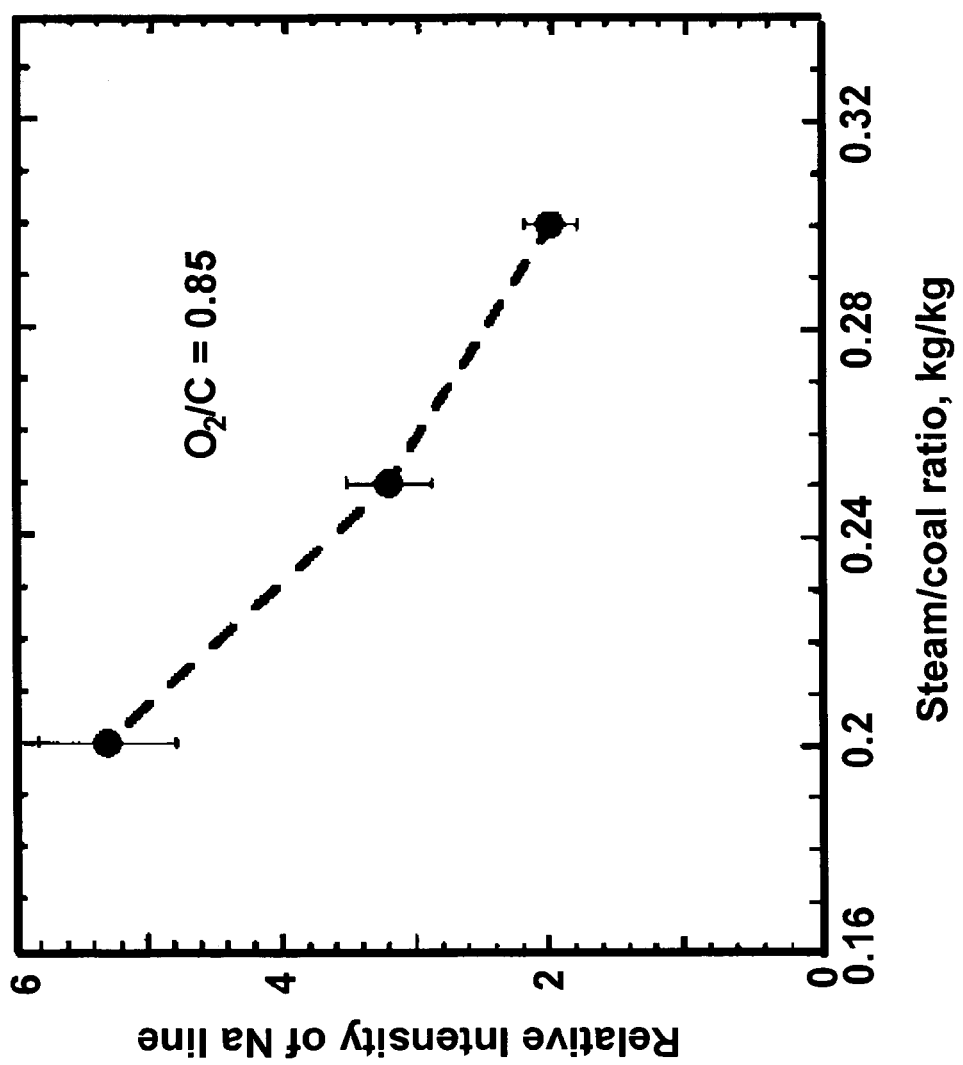
FIG. 10 is a diagram showing the relative intensity of Na lines with a steam-to-coal ratio for $O_2/C=0.85$.

FIG. 10 shows that the relative intensity of the sodium line drops rapidly with increases in the steam-to-coal ratio. When the steam-to-coal ratio is increased from 0.2 to 0.3, the relative intensity of the sodium line drops from ~5.4 to ~2. This shows about a 3-fold variation with a variation in $H_2O/C$ ratio of 50%.

The method for real-time monitoring of flame properties in accordance with one embodiment of this invention comprises collecting light emitted by the flame of interest within the combustor or gasifier using an imaging fiber optic bundle and transmitting the light as an image through the imaging fiber optic bundle to a spectroscopic imaging system in which a selected portion of the image is transformed into an image of spectrally-resolved light intensities represented as a 3-dimensional array comprising light intensities, flame position and light wavelength. The absolute and relative intensities and shapes of spectral lines and bands generated by OH* and CH* radicals, sodium and potassium atoms, and blackbody continuum are then analyzed from which analysis at least one flame property selected from the group consisting of oxygen/coal ratio, steam/coal ratio, temperature, carbon conversion, and sulfur oxide emissions is determined.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A system for real-time monitoring of flame properties in combustors and gasifiers comprising:
   at least one wall enclosing a space and forming a pinhole opening;
   an imaging fiber optic bundle having a light receiving end disposed within said space and having a light output end, said light receiving end aligned with said pinhole opening;
   a spectroscopic imaging system operably connected with said light output end of said imaging fiber bundle; and
   purging means for purging said space.

2. The system of claim 1, wherein said pinhole opening has a diameter in a range of about 1 µm to about 1 mm.

3. The system of claim 2, wherein said diameter is in the range of about 10 µm to about 100 µm.

4. The system of claim 1, wherein said purge means comprises a preheated purge gas.

5. The system of claim 1, wherein said light receiving end is in direct communication with light exterior to said space.

6. A system for real-time monitoring of flame properties in combustors and gasifiers comprising:
   an imaging fiber optic bundle having a light receiving end and a light output end;
   a spectroscopic imaging system operably connected with said light output end of said imaging fiber optic bundle; and
   focusing means for focusing light received by said light receiving end of said imaging fiber optic bundle, said focusing means comprising a wall disposed between said light receiving end and a light source, said wall forming a pinhole opening aligned with said light receiving end.

7. The system of claim 6, wherein said light receiving end of said imaging fiber optic bundle is disposed within an enclosure comprising said wall.

8. The system of claim 7 further comprising purging means for purging said enclosure.

9. The system of claim 8, wherein said purging means comprises a preheated purge gas disposed within said enclosure.

10. The system of claim 6, wherein said pinhole opening has a diameter in a range of about 1 µm to about 1 mm.

11. The system of claim 10, wherein said diameter is in a range of about 10 µm to about 100 µm.

* * * * *